United States Patent
Choi et al.

(10) Patent No.: US 9,753,632 B2
(45) Date of Patent: Sep. 5, 2017

(54) MOBILE TERMINAL AND CONTROL METHOD THEREOF

(71) Applicant: LG ELECTRONICS INC., Seoul (KR)

(72) Inventors: Hyonmi Choi, Seoul (KR); Hyosung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 249 days.

(21) Appl. No.: 14/492,848

(22) Filed: Sep. 22, 2014

(65) Prior Publication Data
US 2015/0089440 A1    Mar. 26, 2015

(30) Foreign Application Priority Data
Sep. 24, 2013 (KR) .......................... 10-2013-0113438

(51) Int. Cl.
G06F 3/048 (2013.01)
G06F 3/0485 (2013.01)
G06F 3/01 (2006.01)
G06F 3/0488 (2013.01)

(52) U.S. Cl.
CPC ............ *G06F 3/0485* (2013.01); *G06F 3/013* (2013.01); *G06F 3/017* (2013.01); *G06F 3/0488* (2013.01); *G06F 3/04855* (2013.01)

(58) Field of Classification Search
CPC .............................. G06F 3/013; G06F 3/0425
See application file for complete search history.

(56) References Cited

U.S. PATENT DOCUMENTS

| | | | | |
|---|---|---|---|---|
| 6,243,076 B1 * | 6/2001 | Hatfield | .................. | G06F 3/013 345/156 |
| 6,438,523 B1 * | 8/2002 | Oberteuffer | ............. | G06F 3/038 382/186 |
| 6,779,060 B1 * | 8/2004 | Azvine | .................. | G06F 3/038 710/11 |
| 9,075,514 B1 * | 7/2015 | Karakotsios | ........ | G06F 3/04842 |
| 9,256,483 B2 * | 2/2016 | Choi | ..................... | G06F 3/0481 |
| 2004/0025115 A1 * | 2/2004 | Sienel | ............... | G06F 17/30896 715/234 |
| 2005/0283532 A1 * | 12/2005 | Kim | .................... | H04L 12/2803 709/225 |
| 2007/0242056 A1 * | 10/2007 | Engelhardt | ........... | G06F 3/0416 345/173 |
| 2010/0156675 A1 * | 6/2010 | Ganey | ..................... | G06F 3/038 341/20 |
| 2011/0260965 A1 * | 10/2011 | Kim | ........................ | G06F 3/013 345/156 |
| 2012/0295708 A1 * | 11/2012 | Hernandez-Abrego | | A63F 13/424 3/424 |

(Continued)

*Primary Examiner* — Dino Kujundzic
(74) *Attorney, Agent, or Firm* — Ked & Associates, LLP

(57) ABSTRACT

Disclosed are a mobile terminal and a control method thereof. The mobile terminal includes a sensing unit, a display unit and a controller. The sensing unit senses a user's sight line. The display unit displays screen information. The controller controls the screen information output on the display unit, based on sight line information corresponding to the sensed user's sight line. When a user's gesture on the display unit is sensed at a time point corresponding to that when the user's sight line is sensed, the controller limits control of the screen information based on the sight line information.

16 Claims, 12 Drawing Sheets

(56) References Cited

U.S. PATENT DOCUMENTS

| | | | | |
|---|---|---|---|---|
| 2012/0306927 | A1* | 12/2012 | Lee | G06F 3/041 |
| | | | | 345/660 |
| 2013/0222270 | A1* | 8/2013 | Winkler | H04M 1/0233 |
| | | | | 345/173 |
| 2013/0265261 | A1* | 10/2013 | Min | G09G 5/006 |
| | | | | 345/173 |
| 2014/0267022 | A1* | 9/2014 | Kim | G06F 3/01 |
| | | | | 345/156 |
| 2014/0354539 | A1* | 12/2014 | Skogo | G06F 3/013 |
| | | | | 345/156 |

* cited by examiner (a)

(b)

(a)　　　　　　　　(b)

(a)　　　　　　　(b)

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0113438, filed on Sep. 24, 2013, the contents of which are incorporated by reference herein in it entirety.

BACKGROUND OF THE INVENTION

1. Field of the Invention

The present disclosure relates to a mobile terminal and a control method thereof, which can sense a user's sight line.

2. Description of the Conventional Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device. Various attempts have been made to implement complicated functions in such a multimedia device by means of hardware or software.

In the mobile terminal, it may be considered that the mobile terminal provides various user interfaces suitable for user's needs. For example, it may be considered that the mobile terminal provides an interface for providing a display unit through sensing of a user's sight line.

In this case, there may occur a problem in which control through the sensing of the user's sight line is mixed with control using a user's gesture. Therefore, the development of a method for solving this problem is required.

SUMMARY OF THE INVENTION

Therefore, an aspect of the detailed description is to provide a mobile terminal and a control method thereof, which limit control using a user's sight line in the mobile terminal capable of performing the control using the user's sight.

Another aspect of the detailed description is to provide a method for controlling a user's sight line and a user's gesture, which are simultaneously sensed.

To achieve these and other advantages and in accordance with the purpose of this specification, as embodied and broadly described herein, a mobile terminal includes: a sensing unit configured to sense a user's sight line; a display unit configured to display screen information; and a controller configured to control the screen information output on the display unit, based on sight line information corresponding to the sensed user's sight line, wherein, when a user's gesture on the display unit is sensed at a time point corresponding to that when the user's sight line is sensed, the controller limits control of the screen information based on the sight line information.

In one exemplary embodiment, if the user's gesture on the display unit is sensed, the controller may control the screen information corresponding to the sight line information even though a sight line control mode for controlling the screen information corresponding to the user's sight line is activated.

In one exemplary embodiment, when a control command through the display unit is not received for a predetermined time after the user's gesture is sensed, the screen information may be controlled corresponding to the sight line information.

In one exemplary embodiment, the user's gesture may be a user's movement contacted with or close to the display unit. The control command through the display unit may be received based on a touch input to the display unit.

In one exemplary embodiment, the sensing unit may include a camera sensor. The sight line information may be obtained from both eye images of the user, input through the camera sensor.

In one exemplary embodiment, the sight line information may be at least one of a moving speed of the sight line, a moving direction of the sight line and a moving trace of the sight line.

In one exemplary embodiment, the controller may change at least one portion of the screen information output on the display unit, based on the sight line information.

In one exemplary embodiment, a screen may be scrolled based on sight line information corresponding to the moving trace of the sight line. A currently output page may be changed into another page, based on sight line information corresponding to the moving direction of the sight line. A function related to the screen information output at the position of the sight line may be performed based on sight line information corresponding to that the sight line does not move for a predetermined time.

In one exemplary embodiment, the user's gesture may correspond to the movement of a user's finger contacted with or close to the display unit. The controller may calculate a relative distance between the display unit and the user's finger, and determine whether to control the screen information based on the sight line information according to the relative distance.

In one exemplary embodiment, when the relative distance is shorter than a predetermined reference distance, the controller may not control the screen information based on the sight line information. When the relative distance is longer than the predetermined reference distance, the controller may control the screen information based on the sight line information.

In one exemplary embodiment, when there exist data related to the screen information output on the display unit and not currently output on the display unit, the controller may control the sensing unit sensing the sight line so that the data not currently output on the display unit is to be output, corresponding to the user's sight line.

In one exemplary embodiment, when the user's gesture is sensed at the same time when the sight line information corresponding to the user's sight line is sensed, the controller may control the screen information according to any one of the sight line information and the user's gesture, based on a predetermined priority order.

In one exemplary embodiment, the predetermined priority order may be changed based on the kind of the screen information output on the display unit.

In one exemplary embodiment, when the screen information is a web browser screen, the predetermined priority order may be to control the screen information based on the sight line information. When the screen information is a keyboard input screen, the predetermined priority order may be to control the screen information based on the user's gesture.

In one exemplary embodiment, the controller may analyze the direction of the user's sight line, using the sight line information, and rotate the screen information output on the display unit to correspond to the direction of the user's sight line.

In one exemplary embodiment, the mobile terminal may further include a main body. When a rotation of the main body is sensed in a state in which an automatic rotation mode for automatically rotating the screen information output on the display unit according to the rotation of the main body is activated, the controller may analyze the direction of the user's sight line, and limit the rotation of the screen information output on the display unit when the direction of the user's sight line corresponds to the display direction of the screen information output on the display unit.

In one exemplary embodiment, if the user's sight line is not sensed for a predetermined time, the controller may change the mode of the mobile terminal into a saving mode for reducing current consumption when the user does not use the mobile terminal.

To achieve these and other advantages and in accordance with the purpose of this specification, as embodied and broadly described herein, a method for controlling a mobile terminal, the method includes: outputting screen information of a display unit; sensing a user's sight line; and controlling the output screen information, based on sight line information corresponding to the sensed user's sight line, wherein, in the controlling of the output screen information, when a user's gesture on the display unit is sensed at a time point corresponding to that when the user's sight line is sensed, the screen information is controlled based on the sight line information.

In one exemplary embodiment, if the user's gesture on the display unit is sensed, the screen information may be controlled corresponding to the sight line information even though a sight line control mode for controlling the screen information corresponding to the user's sight line is activated.

In one exemplary embodiment, when a control command through the display unit is not received for a predetermined time after the user's gesture is sensed, the screen information may be controlled corresponding to the sight line information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, etc.

However, it will be obvious to those skilled in the art that the present invention may be also applicable to a fixed terminal such as a digital TV, a desktop computer and a digital signage, except for specific configurations for mobility.

Figure 1:
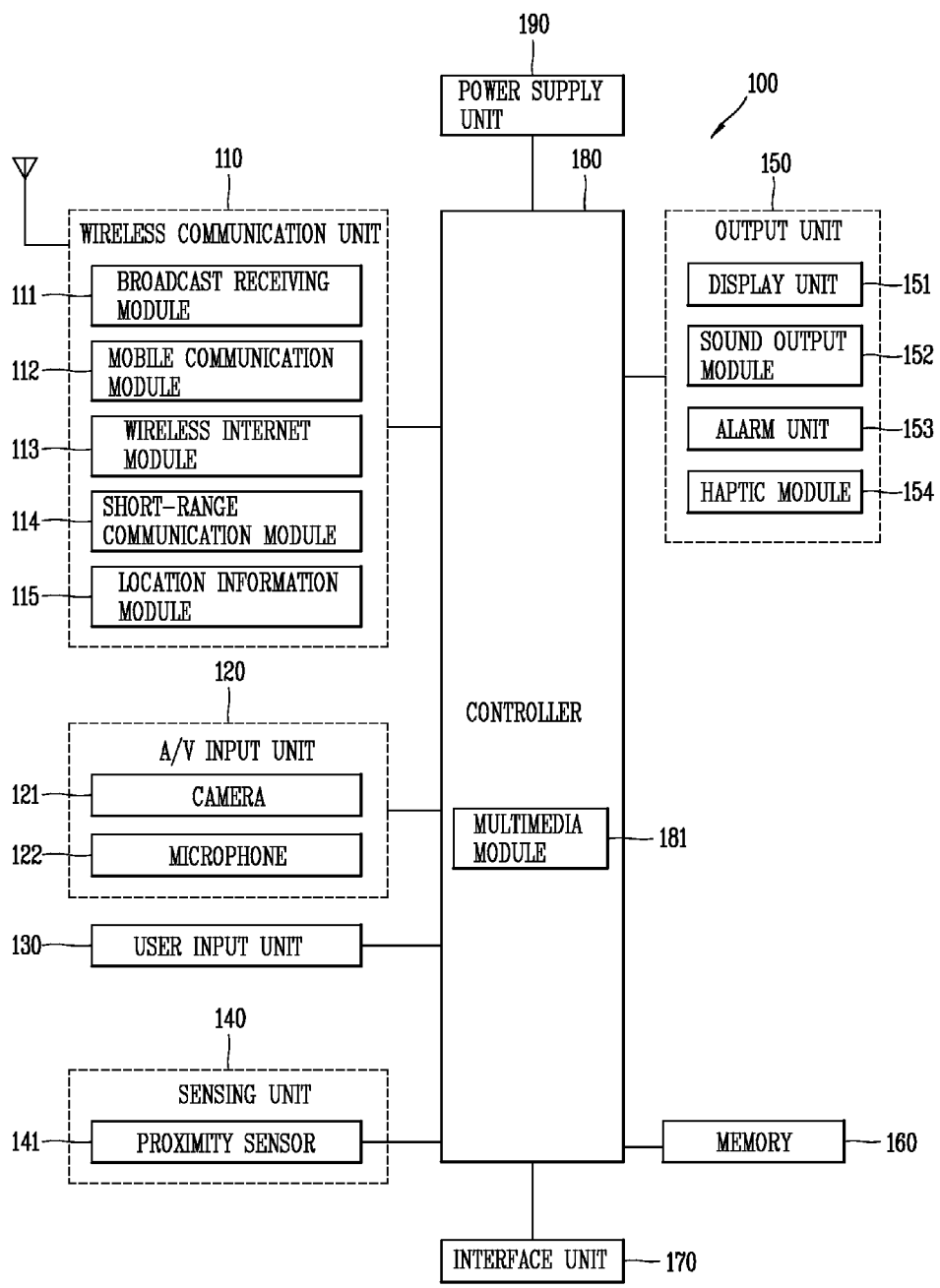
FIG. 1 is a block diagram of a mobile terminal according to an exemplary embodiment.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), Zig-Bee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The NV input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure. Here, the touch object is an object to apply touch to the touch sensor, which may be a finger, a touch pen, a stylus pen, a pointer, etc.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the audio output module 152. Therefore, the display unit 151 and the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
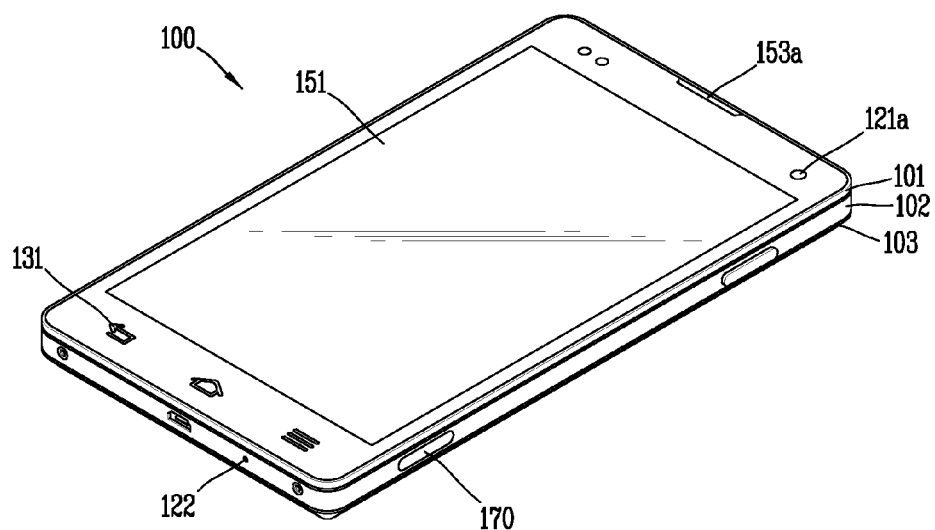
FIG. 2A is a front diagram of the mobile terminal according to an exemplary embodiment.
Figure 2B:
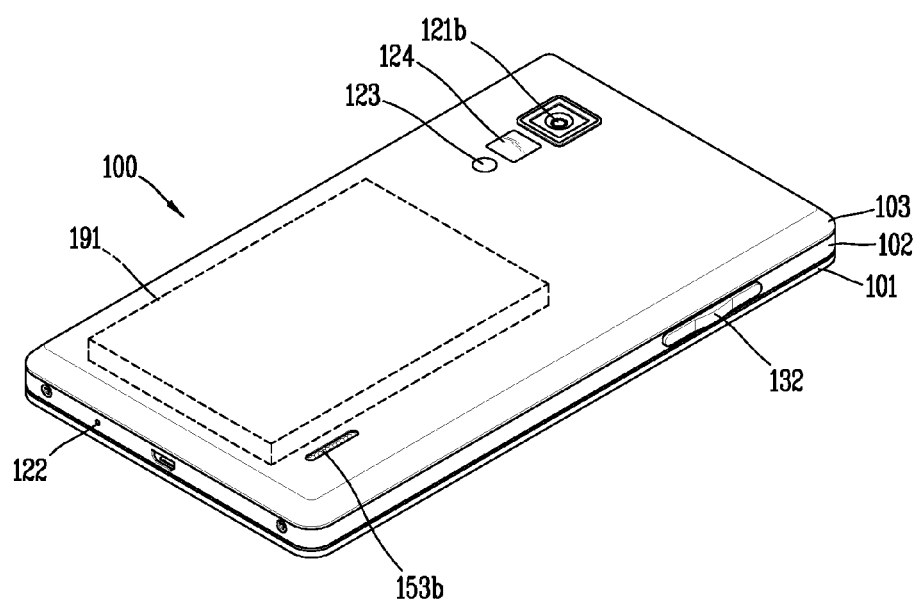
FIG. 2B is a rear diagram of the mobile terminal according to an exemplary embodiment.

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

In a mobile terminal according to an exemplary embodiment, which can include at least one among components as described above, a user's sight line is sensed, and screen information being output on the display unit 151 can be controlled using sight line information corresponding to the sensed sight line. However, when it was required to limit a control command using sight line information, a method for limiting the control command was not conventionally proposed.

Figure 3:
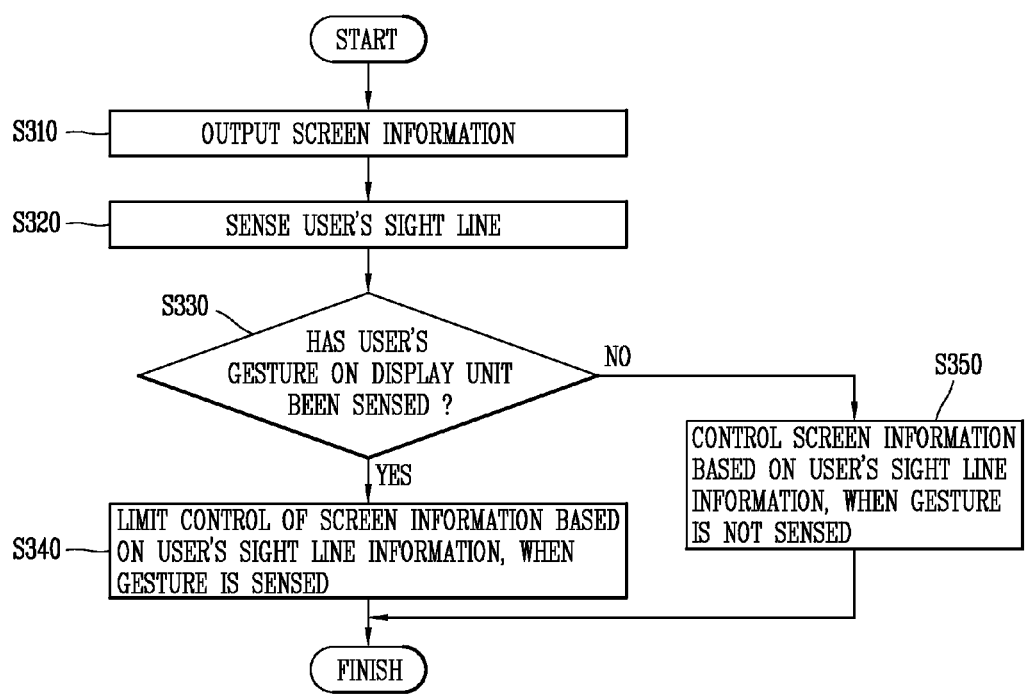
FIG. 3 is a flowchart illustrating a method for limiting control of screen information through a user's sight line in the mobile terminal according to an exemplary embodiment.
Figure 4A:
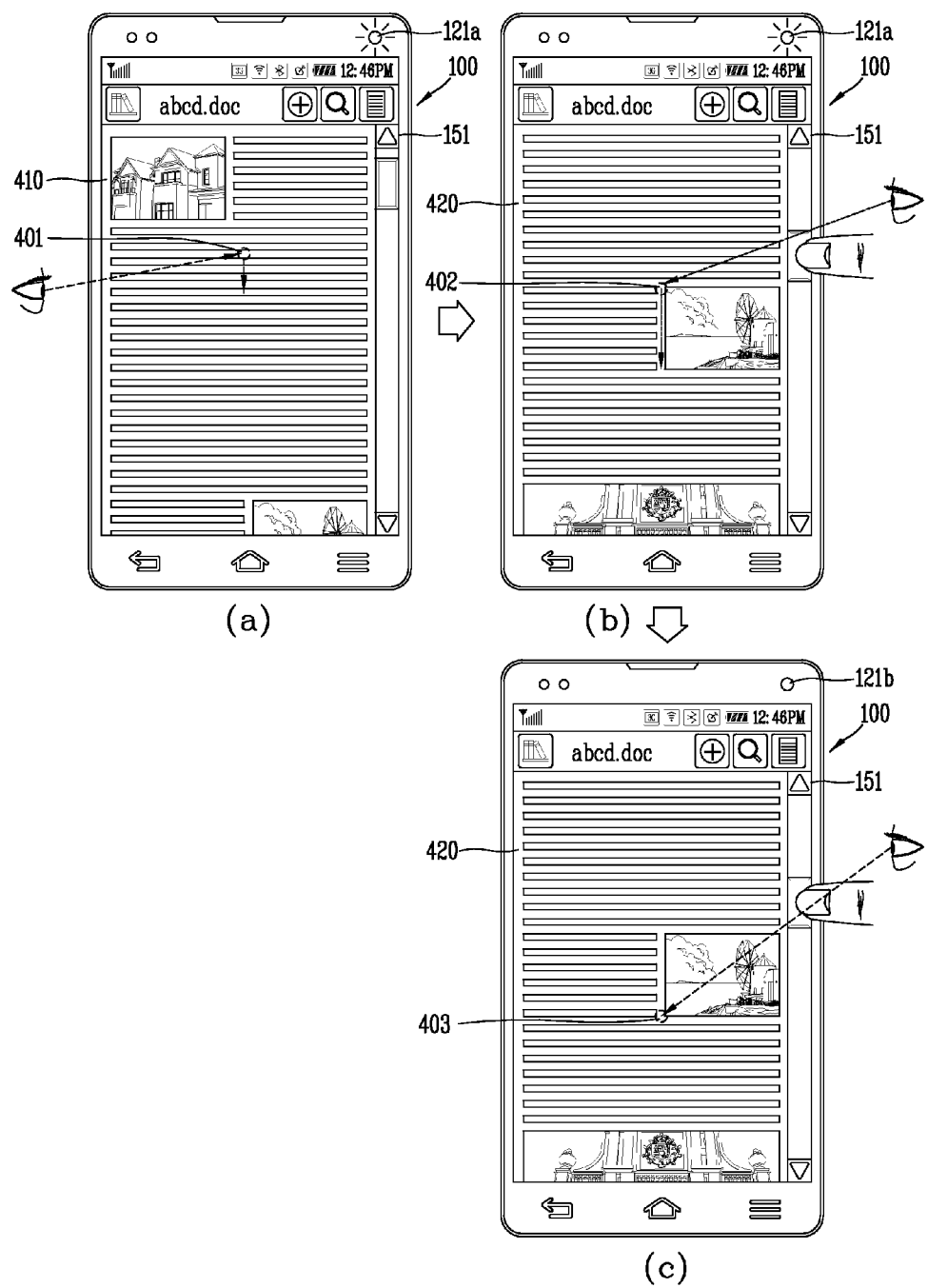
FIGS. 4A and 4B are conceptual diagrams illustrating the control method of FIG. 3.
Figure 4B:
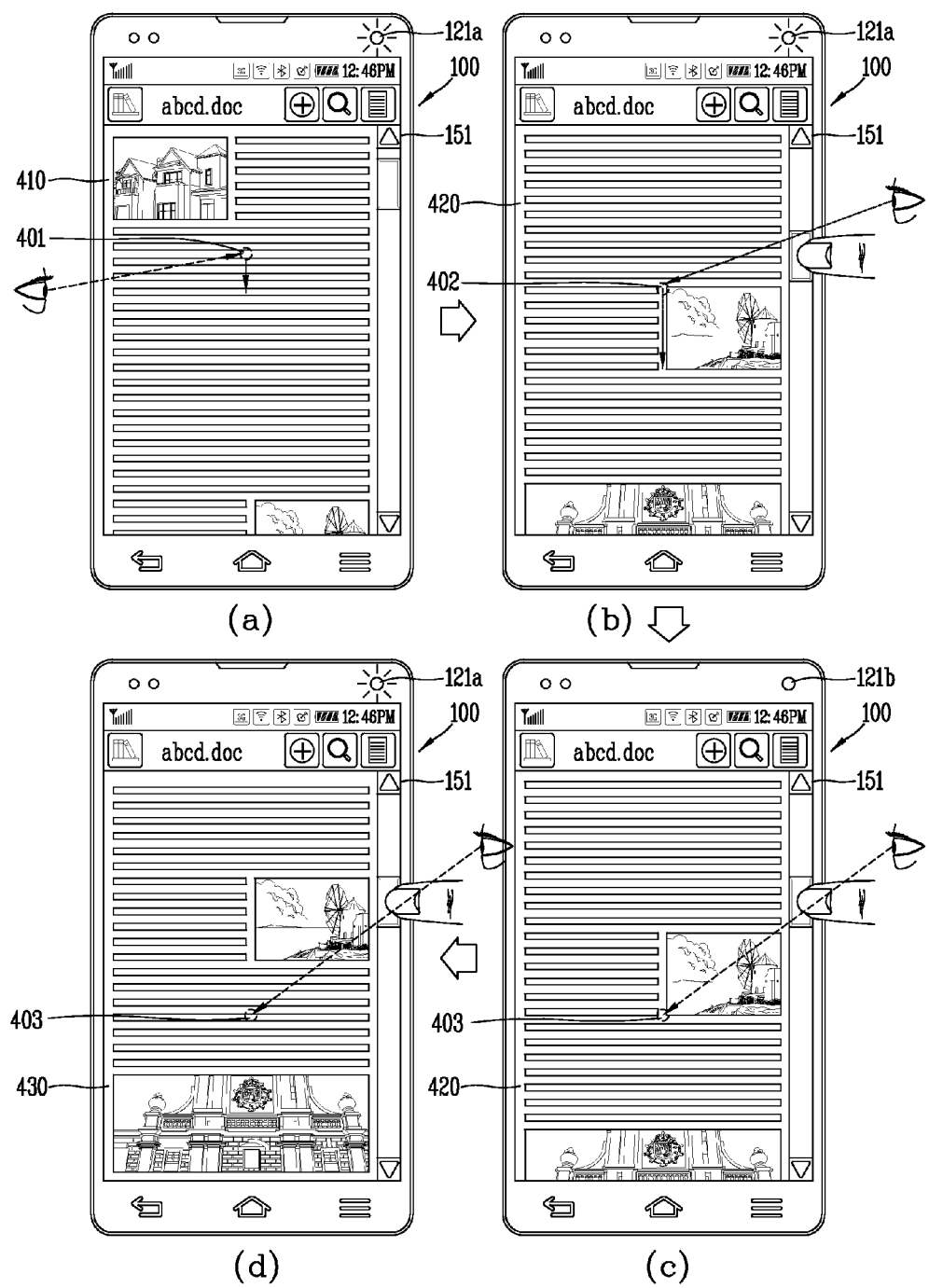

Hereinafter, in control of screen information by sensing a user's sight line, a method for limiting control of screen information using information on the user's sight line will be described. FIG. 3 is a flowchart illustrating a method for limiting control of screen information using information on a user's sight line in the mobile terminal according to an exemplary embodiment. FIGS. 4A and 4B are conceptual diagrams illustrating the control method of FIG. 3.

In the mobile terminal according to the exemplary embodiment, screen information is output on the display unit 151 (S310).

The mobile terminal according to the exemplary embodiment may include the display unit 151 capable of outputting screen information. The display unit 151 may output information related to various functions being executed in the mobile terminal.

The screen information may include all information related to various functions executable in the mobile terminal. For example, the screen information may include information that can be output on the display unit 151, such as screen information related to the execution of an application and screen information related to a home screen page. The screen information related to the home screen page may include information on graphic objects such as icons and widgets corresponding to applications constituting the home screen page. The screen information related to the execution of the application may include document information output in the execution of a document viewer, web browser execution screen output in the execution of an Internet web browser, information output in the execution of an application related to messages, and the like.

The screen information output on the display unit 151 may be controlled by various user's control commands. The user's control command may be performed by individually or simultaneously using at least one method among a touch input, a button input, a voice input and a sight line input. In addition, the user's control command may be performed by user's various operations.

For example, when a control method through a user's sight line is used as the user's control command, the mobile terminal according to the exemplary embodiment may further include the sensing unit 140 capable of sensing the user's sight line. The sensing unit 140 capable of sensing the user's sight line may be the camera 121, a camcorder, or the like.

When a method through a touch input is used as the user's control command, the display unit 151 may have a touch pad capable of recognizing a user's touch. Accordingly, the user can control the screen information using a touch input. In addition, the mobile terminal according to the exemplary embodiment may have various sensors in order to recognize various user's control commands.

The mobile terminal according to the exemplary embodiment senses a user's sight line (S320).

The user's sight line may be sensed by the sensing unit 140. The sensing unit 140 may sense various information including a moving direction of the user's sight line, a moving speed of the user's sight line, a moving trace of the user's sight line, and the like. The moving direction of the user's sight line may be a left, right, upper or lower direction. The moving speed of the user's sight line may be a fast speed, a slow speed, or the like.

The moving trace of the user's sight line is a trace where the user's sight line moves, and may be a diagonal trace, a circular trace, or the like.

The controller 180 may generate sight line information corresponding to the user's sight line, using various information related to the user's sight line. For example, when the moving speed of the user's sight line is sensed, the sight line information corresponding to the user's sight line may be information for controlling the speed at which the conversion of screen information is made to correspond to the moving speed of the user's sight line. For example, when the moving speed of the user's sight line is fast, the controller 180 may control the conversion of the screen information to be made fast. When the moving direction of the user's sight line is sensed, the sight line information corresponding to the user's sight line may be information for moving screen information output on the display unit 151 in a direction corresponding to the moving direction of the user's sight line. When the moving trace of the user's sight line is sensed, the sight line information corresponding to the user's sight line may be information for moving a graphic object output on the display unit 151 along the moving trace of the user's sight line.

In this state, the controller 180 may control the screen information output on the display unit 151, using sight line information corresponding to the sensed user's sight line.

For example, the controller 180 may move the screen information output on the display unit 151 along the direction of the user's sight line. As an exemplary embodiment, a home screen page may be output on the display unit 151. In this state, the sensing unit 140 may sense the direction of the sensed user's sight line. If the direction of the user's sight line is sensed by the sensing unit 140, the controller 180 may control the screen information output on the display unit 151, using sight line information corresponding to the direction of the user's sight line. For example, the home screen page may be moved in a direction corresponding to the direction of the user's sight line on a currently output page.

The user can more conveniently control the display unit 151 through control using the sensing of the user's sight line. Further, although a touch input is not easily made, the user can control the display unit 151 through the user's sight line.

While the display unit 151 is being controlled by time point information corresponding to the sensed user's sight line, the mobile terminal according to the exemplary embodiment may decide whether a user's gesture on the display unit is sensed at a time point corresponding to that at which the user's sight line is sensed (S330).

The sensing unit 140 may also sense a user's gesture as well as the user's sight line. In this state, the sensing unit 140 may further include at least one of a motion sensor, a touch sensor and a proximity sensor, in addition to the camera 121a.

The sensing unit 140 may sense a user's gesture on the display unit 151 at a time point corresponding to that at which the user's sight line is sensed. For example, while the screen information is being controlled along sight line information corresponding to the time point, the sensing unit 140 may sense a user's gesture on the display unit 151.

The user's gesture may be a movement close to or contacted with the display unit 151. For example, the user's gesture may be a movement where a user's finger is close to or contacted with the display unit 151.

The controller 180 may determine whether to control the screen information output on the display unit 151 based on sight line information corresponding to the user's sight line according to whether the user's gesture is sensed. For example, when the user's gesture is sensed, the controller 180 may limit control of the screen information output on the display unit 151 based on the sight line information corresponding to the user's sight line. The controller 180 may control the camera 121a to be non-activated together with the limitation of the control of the screen information output on the display unit 151 based on the sight line information corresponding to the user's sight line. When the control of the screen information output on the display unit 151 based on the sight line information corresponding to the user's sight line is limited, the controller 180 may perform control of the screen information through the user's gesture.

When it is decided that the user's gesture is sensed, the mobile terminal according to the exemplary embodiment limits control of the screen information based on the user's sight line information (S340). When it is decided that the user's gesture is not sensed, the mobile terminal according to the exemplary embodiment controls the screen information based on the user's sight line information (S350).

When it is decided that the user's gesture is sensed, the controller 180 may limit control of the screen information based on the user's sight line information. That is, although the user's sight line is sensed by the sensing unit 140, the controller 180 may not change the screen information based on the sight line information. In this case, the controller 180 may decide that the user intends to perform a control command through a gesture, and control the screen information output on the display unit 151 using the sensed gesture. Accordingly, the user of the mobile terminal can control the display unit 151 using one control command.

However, when any control command is not received through the display unit 151 for a predetermined time even though the user's gesture is sensed, the controller 180 may again control the screen information, corresponding to the sight line information.

For example, although the control of the display unit 151 is limited corresponding to the sight line information, based on the sensing of the user's gesture, the controller 180 may decide whether a control command using a user's gesture is received after the limitation. In this state, when any control command is not received through the display unit 151 for the predetermined time, the controller 180 may decide that the user intends to perform a control command through a gesture, and again control the screen information output on the display unit 151 using the sensed gesture. In this case, the non-activated camera 121b may be again activated.

When it is decided that the user's gesture is not sensed, the controller 180 may control the screen information based on the user's sight line information. In this case, the controller 180 may decide that the user intends to perform a control command based on sight line information, and control the screen information output on the display unit 151 based on the sight line information.

For example, referring to FIG. 4A, an arbitrary document 410 may be output on the display unit 151. In this case, as shown in FIG. 4A (a), the sensing unit 140 may sense a user's sight line. For example, the sensing unit 140 may be the camera 121a. In order to sense the user's sight line, the camera 121a may be activated.

In the state in which the camera 121a is activated, a user's sight line may be sensed in one area 401 of the display unit 151. The user may move the sight line from the one area 401 to another area 402 of the display unit 501. For example, the another area 402 may be an area positioned below the one area 401 of the display unit 151.

In this state, as shown in FIG. 4A (b), the controller 180 may control the screen information output on the display unit 151 using sight line information corresponding to the trace where the user's sight line is sensed. For example, if the user's sight line is moved from an upper area to a lower area of the display unit 151, the screen information output on the display unit 151 may be changed to scroll down the currently output screen information 410, using sight line information corresponding to the moved trace. That is, the screen information output on the display unit 151 may be changed into screen information 420 scrolled down from the currently output screen information 410.

At the time point when the screen information output on the display unit 151 is changed by sight line information corresponding to the user's sight line, the sensing unit 140 may sense a user's gesture contacted with or close to the display unit 151. Referring to FIG. 4A (b), the user's gesture may be a movement where a user's finger is contacted with or close to the display unit 151. For example, the sensing unit 140 may sense a movement where the user's finger is contacted with the display unit 151 as shown in FIG. 4A (b).

In this case, referring to FIG. 4A (c), the screen information 420 output on the display unit 151 may not be changed even though the sight line information corresponding to the user's sight line is changed (403). That is, although a control command according to the sight line information corresponding to the user's sight line is received, the controller 180 may not control the display unit 151 according to the control command. In this case, the controller 180 may control the screen information through a user's touch input applied to the display unit 151. If the user's gesture is sensed, the camera 121b may be non-activated. That is, the user's sight line may not be sensed any more.

In the above, the method for limiting control of screen information based on the user's sight line information has been described. Hereinafter, the case where the control of the screen information based on the user's sight line information is again performed even when the control of the screen information based on the user's sight line information is limited will be described.

Referring to FIGS. 4B (a), (b) and (c), when the user's gesture is sensed at a time point corresponding to that when the user's sight line is sensed, the controller 180 may limit control of the screen information output on the display unit 151 based on the user's sight line information.

However, if a control command (e.g., a control command through a user's gesture, or the like) different from the user's sight line information through the display unit 151 is not received for a predetermined time even when the control of the screen information output on the display unit 151 is limited based on the user's sight line information, the controller 180 may again control the screen information output on the display unit 151 based on the user's sight line information. In this case, the camera 121a may be again activated to sense the user's sight line.

For example, as shown in FIG. 4B (d), the camera 121a may sense that the user's sight line faces a lower direction. In this state, the controller 180 may control the display unit 151, based on sight line information that the user's sight line faces the lower direction. For example, the controller 180 may again scroll the screen information 420 output on the display unit 151, corresponding to the sight line information. Thus, screen information 430 in a lower area from the currently output screen information 420 may be output on the display unit 151.

In the above, the method for limiting control of screen information output on the display unit 151 based on sight line information corresponding to the user's sight line has been described. Accordingly, when the user desires to control screen information through a gesture input while the control of the screen information is performed based on the sight line information, the user can end the control of the screen information based on the sight line information and control the screen information through the gesture input, without any separate manipulation.

Figure 5A:
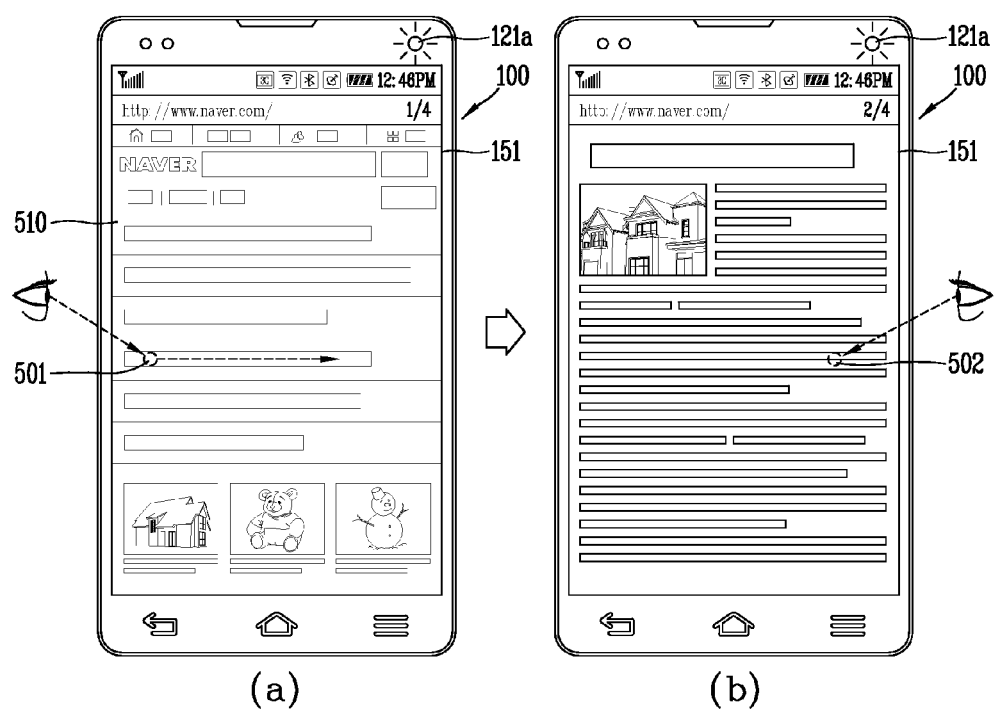
FIGS. 5A and 5B are conceptual diagrams illustrating a method for controlling screen information along a user's sight line.
Figure 5B:
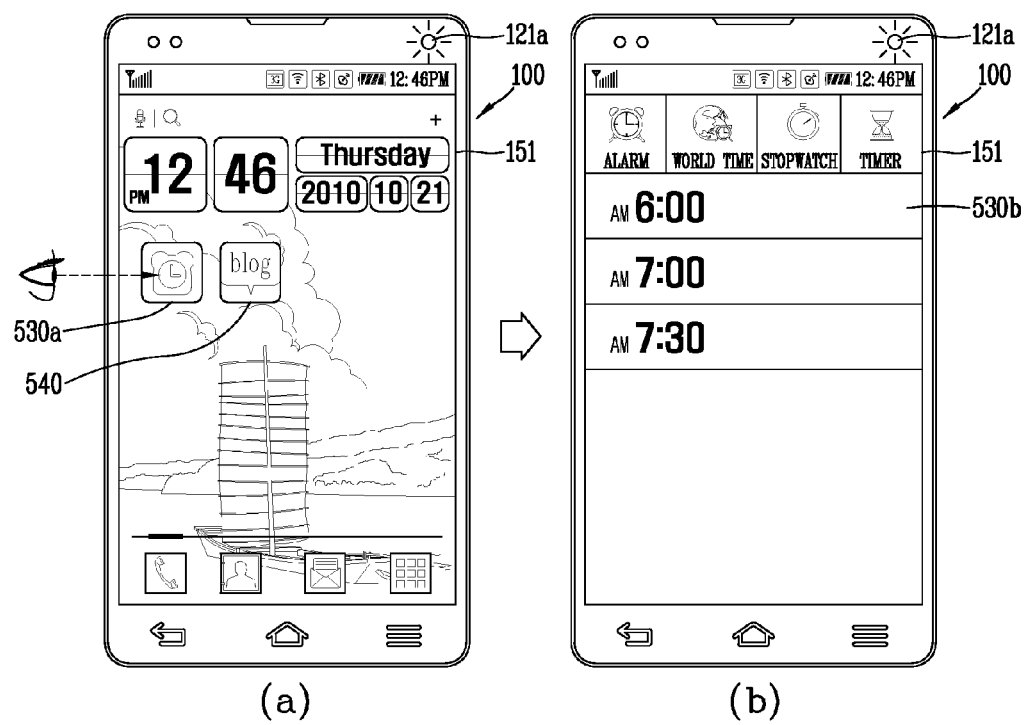

Hereinafter, the method for controlling screen information output on the display unit 151 using sight line information corresponding to the user's sight line will be described in detail. FIGS. 5A and 5B are conceptual diagrams illustrating a method for controlling screen information using sight line information corresponding to a user's sight line.

The sensing unit 140 may sense a user's sight line using various sensors including the camera 121a and the like. In this state, the sensed user's sight line may include a moving direction of the user's sight line, a moving speed of the user's sight line, a moving trace of the user's sight line, and the like. The controller 180 may change screen information output on the display unit 151, based on the sensed user's sight line.

For example, as shown in FIG. 5A (a), a web browser page 510 may be output on the display unit 151. In this case, the camera 121a may sense movement of a user's sight line. For example, the user may move the sight line from a left side 501 to a right side 502.

If the movement of the user's sight line is sensed, the controller 180 may change the screen information output on the display unit 151, based on the movement of the user's sight line. As an example, as shown in FIG. 5A (b), the currently output web browser page 510 may be changed into another web browser page 520, corresponding to the movement of the user's sight line. For example, the controller 180 may move a screen to the next web browser page 520 of the currently output web browser page 510.

As another example, a home screen page may be output on the display unit 151 as shown in FIG. 5B (a). Icons 530a and 540 related to a plurality of applications may be output on the home screen page.

For example, the camera 121a may sense a user's sight line. In this state, the camera 121a may sense that the user's sight line is fixed to the icon 530a related to any one application in the icons 530a and 540 related to the plurality of applications. In this case, referring to FIG. 5B (b), the controller 180 may execute an application corresponding to the icon 530a output at a position where the user's sight line is fixed, based on that the user's sight line is fixed for a predetermined time or more. For example, when the icon is an icon related to an alarm, an execution screen 530b of an alarm application may be output on the display unit 151.

In the above, the method for sensing a user's sight line and controlling screen information output on the display unit 151 using sight line information corresponding to the sensed user's sight line has been described. Accordingly, the user can conveniently use the mobile terminal through only the movement of a user's sight line, without any separate gesture.

Figure 6:
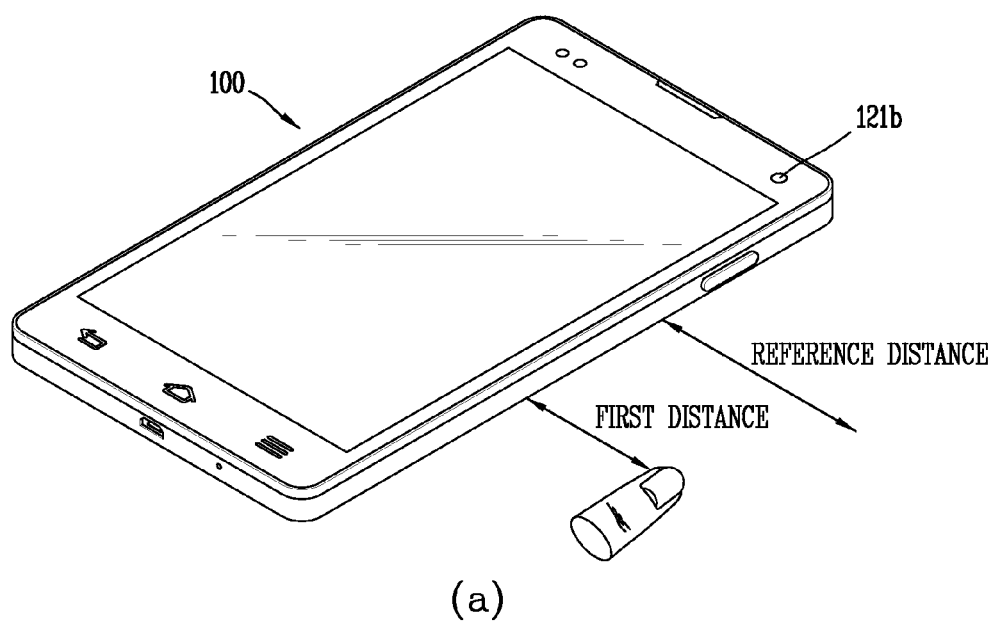
FIG. 6 is a conceptual diagram illustrating a state in which a camera is activated based on that a user's gesture is sensed.
Figure 6:
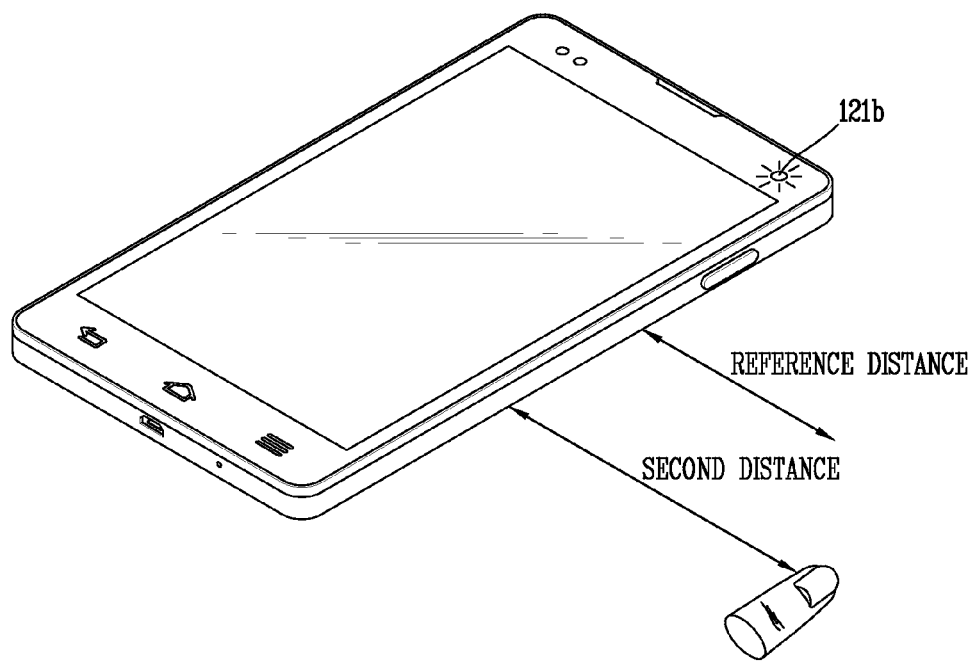

Hereinafter, the user's gesture on the display unit 151 will be described in detail. FIG. 6 is a conceptual diagram illustrating one exemplary embodiment of the user's gesture on the display unit 151.

When a user's gesture on the display unit 151 is sensed at the time point when a user's sight line is sensed, the controller 180 may limit control of screen information output on the display unit 151 based on sight line information corresponding to the user's sight line. In this case, the user's gesture on the display unit 151 may be a user's movement contacted with or close to the display unit 151. The movement contacted with or close to the display unit 151 may be sensed by a touch pad or a proximity sensor.

The controller 180 may determine whether to perform the control based on the sight line information according to a distance at which a user's finger is close to the display unit 151. In this state, the controller 180 may calculate a relative distance between the user's finger and the display unit 151.

Subsequently, the controller 180 may determine whether to perform the control based on the user's sight line information by comparing the relative distance with a predetermined reference distance. For example, when the relative distance is within the predetermined reference distance, the controller 180 may limit the control of the screen information based on the sight line information. In this case, the controller 180 may decide that the user intends to control the screen information through the user's gesture. When the relative distance is longer than the predetermined reference distance, the controller 180 may control the screen information, based on the sight light information. In this case, the controller 180 may decide that the user intends to control the screen information based on the sight line information.

As an example, as shown in FIG. 6 (*a*), the controller 180 may previously determine a reference distance in order to determine whether to perform the control based on the sight line information. In this case, the controller 180 may measure a relative distance between the display unit 151 and the user's finger. Subsequently, the controller 180 may compare the measured relative distance with the predetermined reference distance. For example, when the relative distance is a first distance, the first distance may be a distance shorter than the predetermined reference distance. In this state, the controller 180 may limit the control of the screen information based on sight line information corresponding to the user's sight line. The controller 180 may control the camera 121*b* to be non-activated. In this case, the controller 180 does not limit the control of the screen information based on the sight line information but may control the screen information based on the user's gesture.

As another example, as shown in FIG. 6 (*b*), the controller 180 may measure a relative distance between the display unit 151 and the user's finger. Subsequently, the controller 180 may compare the measured relative distance with the predetermined distance. For example, when the relative distance is a second distance, the second distance may be a distance longer than the predetermined reference distance. In this state, the controller 180 may control the screen information based on sight line information corresponding to the user's sight line. The controller 180 may control the camera 121*a* to be activated. In this case, the controller 180 does not control the screen information based on the sight line information but may limit the control of the screen information based on the user's gesture.

In the above, the method for controlling screen information using sight line information, based on the user's gesture on the display unit has been described. Accordingly, the user can efficiently manage the control using the sight line information and the control using the gesture.

Figure 7A:
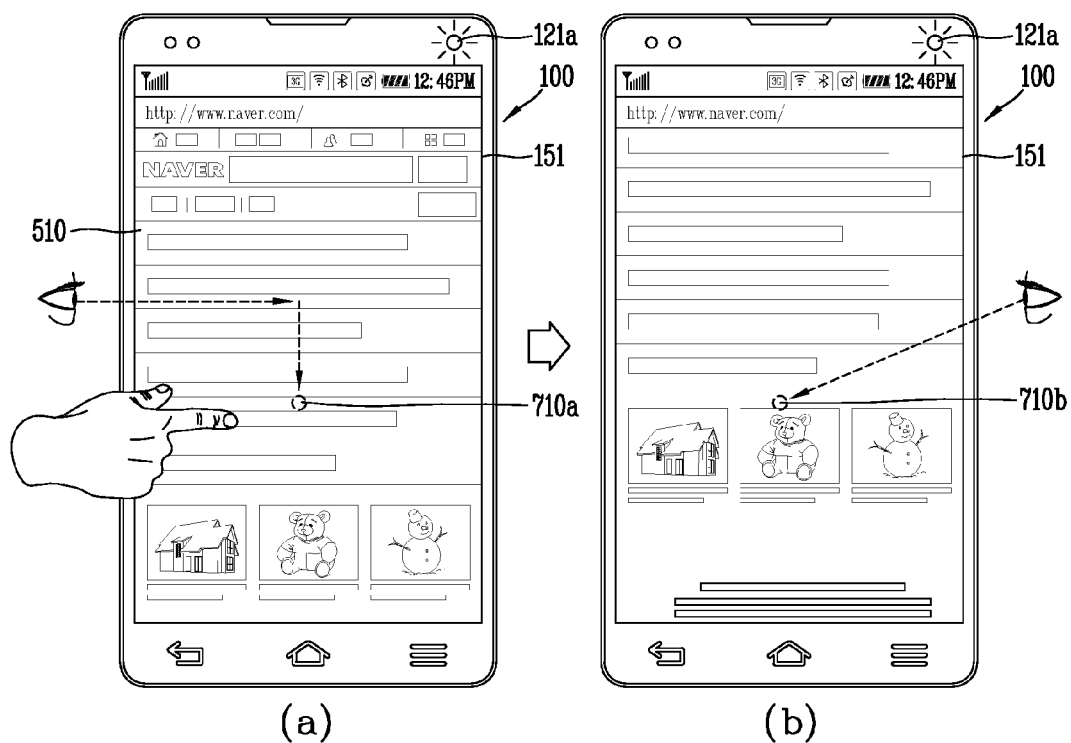
FIGS. 7A and 7B are conceptual diagrams illustrate a state in which the control method is changed depending on screen information.
Figure 7B:
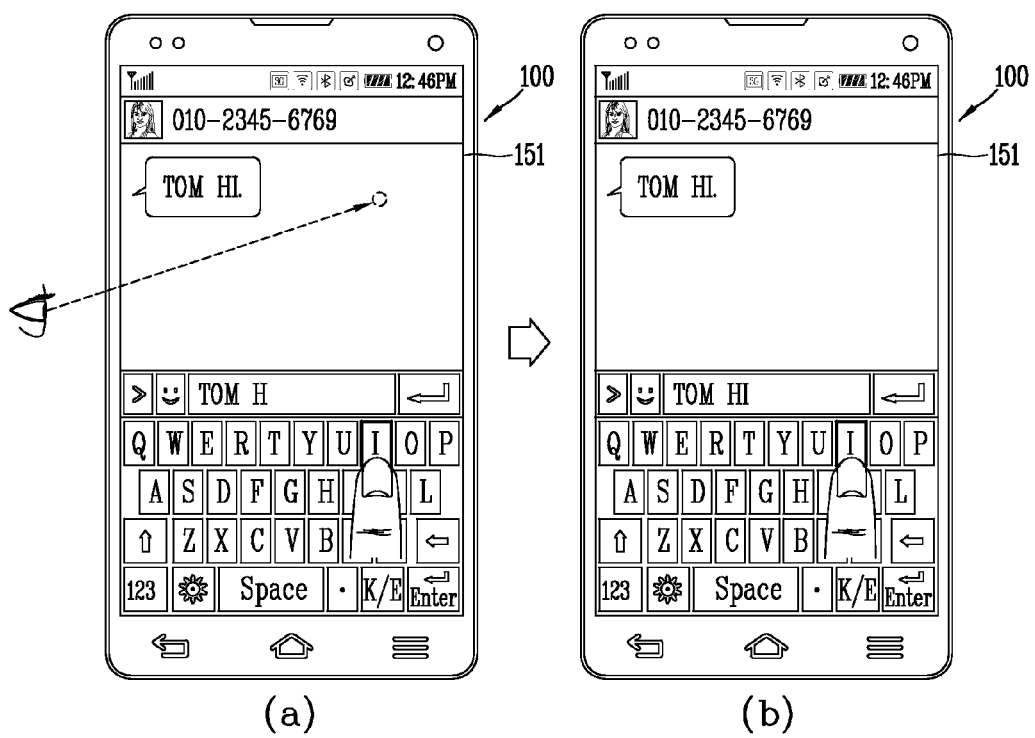

Hereinafter, the case where the control method is changed depending on the kind of screen information when a control command using sight line information and a control command using a gesture are received at the same time will be described. FIGS. 7A and 7B are conceptual diagrams illustrate a state in which when a control command using user's sight line information and a control command using a user's gesture are received at the same time, it is determined which control command is selected based on screen information.

The controller 180 may receive a plurality of control command at the same time. The plurality of control commands may be a control command using sight line information, a control command using a gesture, and the like. In this case, the controller 180 may select any one of the plurality of control commands, by which the control is performed. The selection of any one of the plurality of control commands may be performed by the user.

When the selection is performed, the controller 180 may select any one of the plurality of control commands, by which the control is performed, based on a predetermined priority order. The predetermined priority order may be determined based on various references. For example, the predetermined priority order may be determined based on the kind of screen information. When the screen information requires only a scrolling function as an output of simple information, the predetermined priority order may be a control command using sight line information. When the screen information requires a specific manipulation such as a keyboard input, the predetermined priority order may be a control command using a gesture.

As an example, as shown in FIG. 7A (a), a web browser page may be output on the display unit 151. In this state, the controller 180 may simultaneously receive a control command using sight line information and a control command using a gesture. In this case, the controller 180 may determine whether to use the control command using the sight line information or the control command using the gesture. In this state, the controller 180 may determine which control command is used, based on a predetermined priority order. The predetermined priority order may be determined based on screen information. For example, when the screen information is a web browser page, a scrolling function of the web browser page is frequently used, and hence the priority order may be the control command using the sight line information. Thus, as shown in FIG. 7A (b), the web browser page can be scrolled identically to the user's sight line, based on sight line information corresponding to the movement of the user's sight line.

As another example, referring to FIG. 7B, screen information in which characters can be input may be output on the display unit 151. In this state, the controller 180 may simultaneously receive a control command using user's sight line information and a control command using a user's gesture. When the plurality of control commands are simultaneously received, the controller 180 may perform control according to any one of the plurality of control commands, based on a predetermined priority order. The predetermined priority order may be changed by the screen information. For example, when screen information in which a character input is necessary is output on the display unit 151, the character input screen requires elaborate manipulation, and hence the priority order may be the control command using the gesture. Thus, as shown in FIG. 7B (b), it can be seen that a keyboard input is applied by the control command using the gesture.

In the above, the method for selecting any one of the control command using the users' sight line and the control command using the user's gesture, which are received at the same time has been described. Accordingly, the user can allow a desired control command to be received, without any separate manipulation.

Figure 8A:
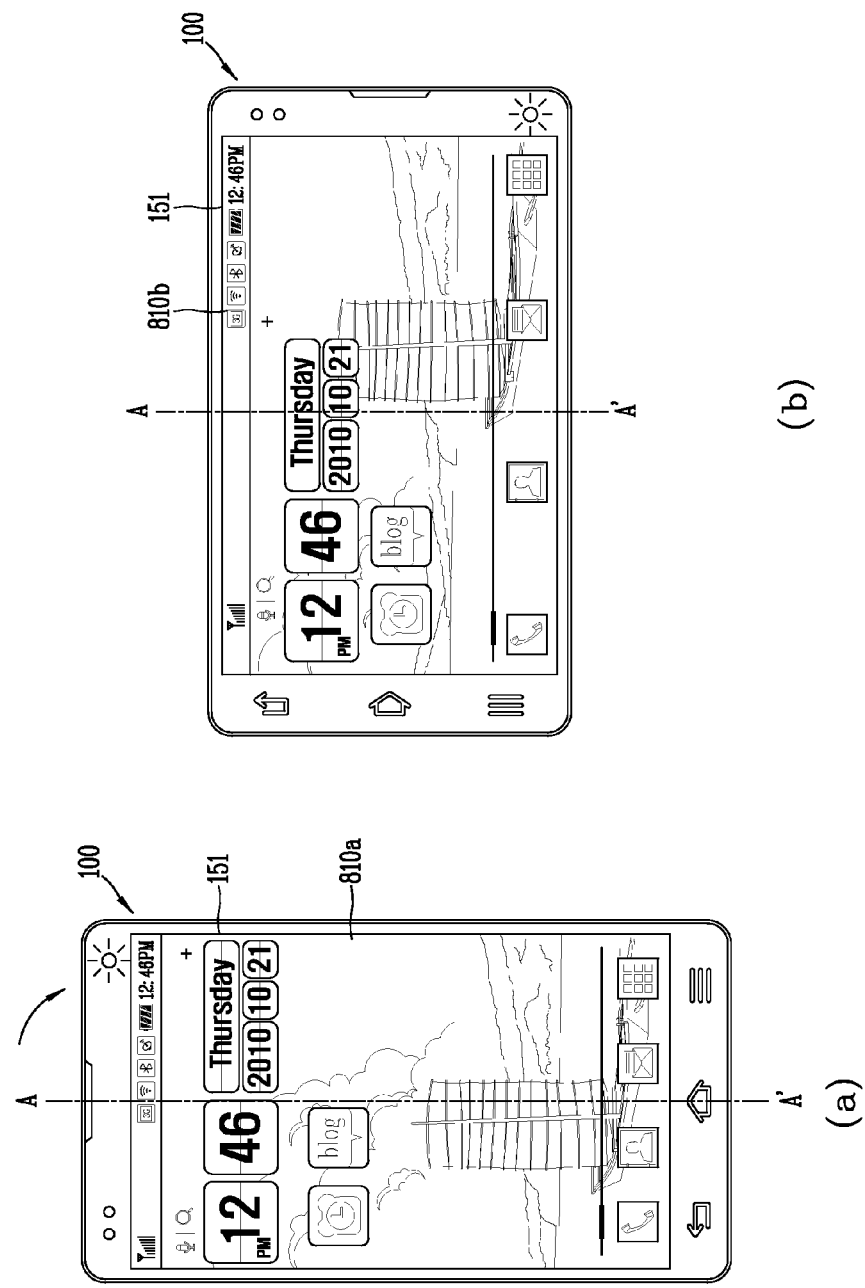
FIGS. 8A and 8B are conceptual diagrams illustrating a state in which the display direction of screen information is changed.
Figure 8B:
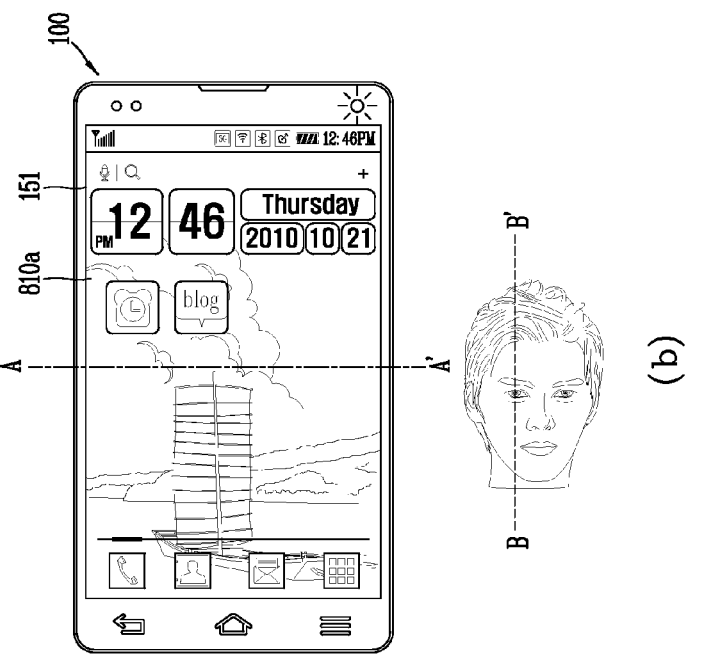
Figure 8B:
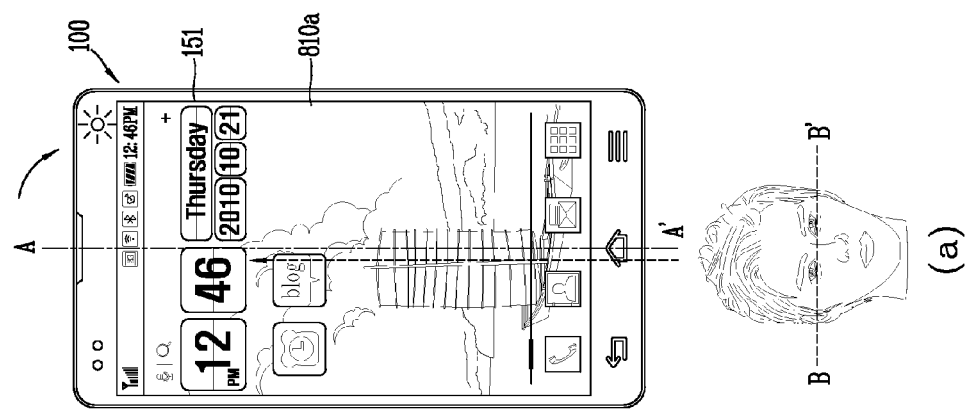

Hereinafter, a method for changing the display direction of a screen using the direction of a user's sight line will be described. FIGS. 8A and 8B are conceptual diagrams illustrating a state in which when the display direction of a screen is changed depending on a rotation of the main body, the display direction of the screen is changed by considering the direction of a user's sight line.

An automatic rotation mode for automatically rotating screen information output on the display unit 151 according to a rotation of a main body 100 may be set in the mobile terminal according to the exemplary embodiment. For example, the screen information may be output on the display unit 151, based on the length direction of the main body 100. In this state, when the main body 100 is rotated based on the length direction, the display direction of the screen information output on the display unit 151 may be changed based on the rotation of the main body 100. Here, the changed display direction of the screen information may be the width direction of the main body 100.

When the automatic rotation mode is set, the mobile terminal according to the exemplary embodiment may first perform a process of sensing a user's sight line before the display direction of the screen information is rotated. That is, although the display direction of the screen information is to be changed as the main body 100 is rotated, the controller 180 does not change the display direction of the display unit 151, based on the sensed direction of the user's sight line, but may maintain the display direction of the display unit 151 as it is. Accordingly, the user can always obtain the display direction of screen information, corresponding to the direction of the user's sight line.

For example, as shown in FIG. 8A (a), there may exist a virtual axis A-A' corresponding to the length direction of the main body 100. When the main body 100 is in parallel to the virtual axis A-A', screen information 810*a* may be output on the display unit 151, based on the virtual axis A-A'. Subsequently, as shown in FIG. 8A (b), the main body 100 may be rotated based on the virtual axis A-A'. For example, the rotation may be a rotation of 90 degrees. When the main body 100 is rotated, the screen information 810*a* output on the display unit 151 may be changed based on the rotation. For example, when the rotation is a rotation of 90 degrees, the screen information may also be screen information 810*b* rotated by 90 degrees.

However, although the main body 100 is rotated, the controller 180 may limit the change of the display direction of the screen information through sensing of a user's sight line. For example, when the direction of the user's sight line is rotated in the same direction as the main body 100 is rotated, the controller 180 may allow the display direction of the screen information not to be rotated.

For example, as shown in FIG. 8B (b), the main body 100 may be rotated by 90 degrees based on the virtual axis A-A'. In this state, the direction of the user's sight line may also be rotated by 90 degrees based on a virtual axis B-B'. In this case, the direction of the user's sight line corresponds to the display direction of the screen information, and hence the controller 180 may not change the display direction of the screen information 810*a*.

In the above, the method for limiting the change of the display direction of screen information output on the display unit 151 using the direction of the user's sight line has been described. Accordingly, the user can always view screen information corresponding to the direction of the user's sight line.

In the present disclosure, when the user's gesture is sensed while screen information is being controlled using a user's sight line, the control of the screen information using the user's sight line can be limited. Accordingly, when the user desires to perform control using a user's gesture during the control using the user's sight line, the user can control screen information using the user's gesture, without any separate setting.

Further, when a control command using a user's sight line and a control command using a user's gesture are input at the same time, the control of screen information is performed by a predetermined priority order. Accordingly, the user can control screen information even when a plurality of control commands are input at the same time.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a sensing unit configured to sense a user's sight line;
a touch screen; and
a controller configured to:
  display, on the touch screen, screen information;
  receive a first control command using sight line information corresponding the user's sight line and a second control command using a user's gesture applied to the touch screen;
  determine a priority order based on a type of the screen information when the first control command and the second control command is received simultaneously, wherein when the screen information is a web browser page the first control command is to have higher priority than the second control command, wherein when the screen information is a keyboard input screen, the second control command is to have higher priority than the first control command;
  determine which control command among the first control command and the second control command is to be processed, based on the determined priority order; and
  execute a function related to the screen information in response to the determined control command.

2. The mobile terminal of claim 1, wherein the user's gesture is a user's movement with respect to the touch screen, and wherein the second control command is received based on a touch input to the touch screen.

3. The mobile terminal of claim 1, wherein the sight line information is one of a moving speed of the sight line, a moving direction of the sight line and a moving trace of the sight line.

4. The mobile terminal of claim 1, wherein the sensing unit includes a camera sensor, and
wherein the sight line information is obtained from eye images of the user, wherein the eye images are received through the camera sensor.

5. The mobile terminal of claim 1, wherein the controller changes at least one portion of the displayed screen information based on the sight line information.

6. The mobile terminal of claim 1, wherein a screen is scrolled based on sight line information corresponding to a moving trace of the sight line,
wherein a currently output page is changed to another page based on sight line information corresponding to a moving direction of the sight line.

7. The mobile terminal of claim 1, wherein the user's gesture corresponds to movement of a user's finger with respect to the touch screen, and
wherein the controller determines a relative distance between the touch screen and the user's finger, and the controller determines whether to control the screen information based on the sight line information according to the determined relative distance.

8. The mobile terminal of claim 1, wherein when there exist data related to the displayed screen information and the data is not currently displayed on the touch screen, the controller controls the sensing unit to sense the sight line such that the data not currently displayed on the touch screen is to be output, corresponding to the user's sight line.

9. The mobile terminal of claim 1, wherein the controller analyzes a direction of the user's sight line, by using the sight line information, and the controller rotates the displayed screen information to correspond to the direction of the user's sight line.

10. The mobile terminal of claim 9, further comprising a main body,
wherein rotation of the main body is sensed during activation of an automatic rotation mode for automatically rotating the displayed screen information according to the rotation of the main body, the controller analyzes the direction of the user's sight line, and limits the rotation of the displayed screen information when the direction of the user's sight line corresponds to the display direction of the displayed screen information.

11. The mobile terminal of claim 1, wherein when the user's sight line is not sensed for a specific predetermined time, the controller changes the mobile terminal to a saving mode for reducing current consumption when the user does not use the mobile terminal.

12. A method for controlling a mobile terminal, the method comprising:
outputting screen information at a touch screen;
sensing a user's sight line and a user's gesture applied to the touch screen;
receiving a first control command using sight line information corresponding the user's sight line and a second control command using a user's gesture applied to the touch screen;
determining a priority order based on a type of the screen information when the first control command and the second control command is received simultaneously, wherein when the screen information is a web browser page, the first control command is to have higher priority than the second control command, and wherein when the screen information is a keyboard input screen, the second control command is to have higher priority than the first control command;
determining which control command among the first control command and the second control command is to be processed, based on the determined predetermined priority order, wherein the predetermined priority order is based on a type of the screen information; and
execute a function related to the screen information in response to the determined control command.

13. The method of claim 12, wherein the user's gesture is a user's movement with respect to the touch screen, and
wherein the control command is received based on a touch input to the touch screen.

14. The method of claim 12, wherein the sight line information is one of a moving speed of the sight line, a moving direction of the sight line and a moving trace of the sight line.

15. The method of claim 12, further comprising obtaining, from a camera sensor, eye images of the user, and obtaining sight line information based on the eye images.

16. The method of claim 12, further comprising changing at least one portion of the displayed screen information based on the sight line information.

* * * * *